(12) United States Patent
Ewerhart et al.

(10) Patent No.: US 8,648,613 B2
(45) Date of Patent: Feb. 11, 2014

(54) CONTROL DEVICE AND METHOD FOR TRIGGERING PERSON PROTECTING DEVICE

(75) Inventors: Frank Ewerhart, Ellhofen (DE); Reiner Marchthaler, Gingen (DE); Mario Kroeninger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 306 days.

(21) Appl. No.: 12/672,642

(22) PCT Filed: Jul. 7, 2008

(86) PCT No.: PCT/EP2008/058737
§ 371 (c)(1),
(2), (4) Date: Apr. 9, 2012

(87) PCT Pub. No.: WO2009/019093
PCT Pub. Date: Feb. 12, 2009

(65) Prior Publication Data
US 2012/0187962 A1 Jul. 26, 2012

(30) Foreign Application Priority Data

Aug. 6, 2007 (DE) .......................... 10 2007 037 086
Jan. 24, 2008 (DE) .......................... 10 2008 005 991

(51) Int. Cl.
*G01R 27/26* (2006.01)
(52) U.S. Cl.
USPC ........... 324/658; 324/663; 324/665; 324/667; 324/672
(58) Field of Classification Search
USPC .......................................... 324/658

IPC ..... B60R 21/01,21/015, 21/017; G01G 19/4142
See application file for complete search history.

(56) References Cited

U.S. PATENT DOCUMENTS

| 2002/0163429 A1* | 11/2002 | Otterbach et al. ............ 340/517 |
| 2004/0066023 A1* | 4/2004 | Joseph .......................... 280/735 |
| 2004/0108698 A1* | 6/2004 | Rothleitner ................... 280/735 |
| 2004/0174005 A1* | 9/2004 | Shimizu ........................ 280/735 |
| 2007/0159178 A1* | 7/2007 | Stanley et al. ................ 324/457 |
| 2008/0169629 A1* | 7/2008 | Schumacher et al. ......... 280/735 |
| 2009/0167004 A1* | 7/2009 | Tani et al. ..................... 280/735 |

FOREIGN PATENT DOCUMENTS

| DE | 42 091 40 | 9/1992 |
| DE | 103 33 988 | 2/2005 |
| EP | 0 937 612 | 8/1999 |
| WO | WO 2005/012052 | 2/2005 |

OTHER PUBLICATIONS

International Search Report for PCT/EP2008/058737, dated Dec. 5, 2008.

* cited by examiner

Primary Examiner — Jermele M Hollington
Assistant Examiner — Adam Clarke
(74) Attorney, Agent, or Firm — Kenyon & Kenyon LLP

(57) ABSTRACT

In method and a control device for triggering person protection device, a signal of a planarly measuring environment sensor system and a second signal of a contact sensor system are evaluated separately in order to produce a respective trigger signal. These two trigger signals are then gated in order to produce a third trigger signal. A trigger circuit triggers the person protection device as a function of this third trigger signal.

10 Claims, 2 Drawing Sheets

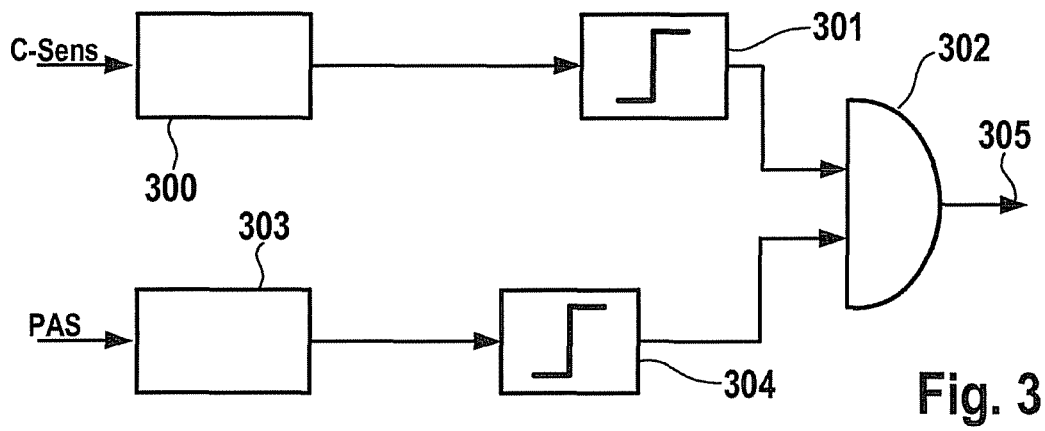
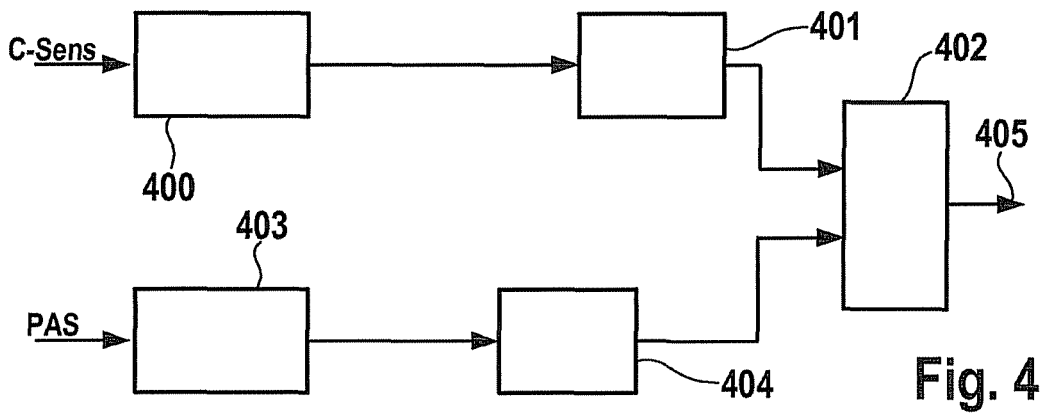
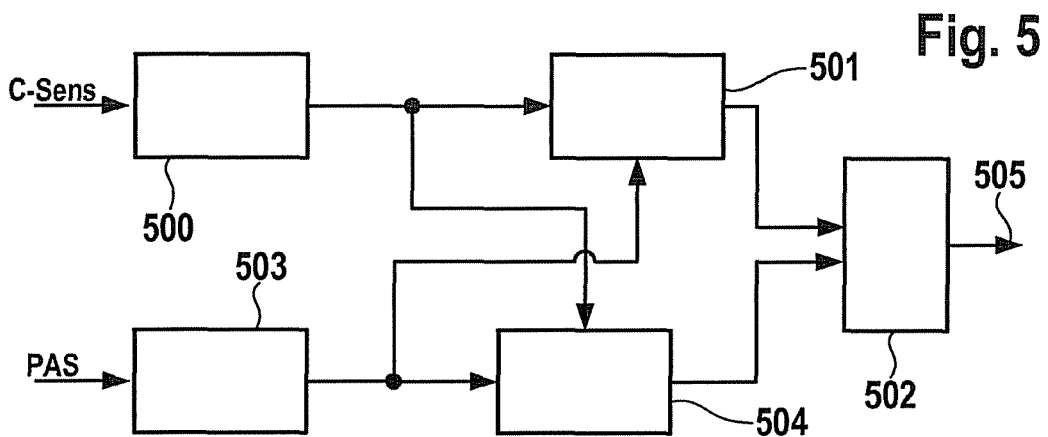

CONTROL DEVICE AND METHOD FOR TRIGGERING PERSON PROTECTING DEVICE

FIELD OF THE INVENTION

The present invention relates to a control device and to a method for triggering person protecting device.

BACKGROUND INFORMATION

From GB 2 404 443 A, a capacitive planar environment sensor is already known. Here the fact is exploited that an object that is moving in the range of acquisition of the capacitive sensor causes a change in the capacitance value acquired by the environment sensor by forming a series circuit on the capacitance between the earth and the object and the object and the sensor.

SUMMARY

In contrast, the control device according to example embodiments of the present invention and the method according to the example embodiments of present invention for triggering person protecting device having the features described herein have the advantage that now a first signal of a planarly measuring capacitive environment sensor system and a second signal of a contact sensor system are combined with each other in such a way that a trigger signal for the person protecting device is produced therefrom. Here it is decisive that the signals of the two sensor systems are evaluated separately. Thus, a two-path decision is provided. It is also possible, but not necessary, here to provide a separation in terms of hardware in order to ensure increased reliability of the triggering decision. Through this combination of the signals in order to produce the triggering signal, a shortening of the triggering time is, which is useful above all for a timely airbag triggering in the case of a side crash, due to the practically non-existent crumple zone.

In comparison with the capacitive sensor, with its planarly formed sensor mechanism, other environment sensor systems, such as radar, lidar, or ultrasound sensors, have the disadvantage that they measure in beam-type fashion, and therefore do not cover as large parts of the side of the vehicle. In addition, as a rule a measurement up to contact is not possible using radar, lidar, or ultrasound sensors due to the measurement method, for example the pulse runtime, and due to the overdriving of the receiver when the distance is too small.

In the present case, "capacitively" means that a change in capacitance is acquired due to the object penetrating into the acquisition range of the environment sensor system. "Planarly" means that a considerable part, for example 10*10 cm^2, of a vehicle side part is used for object acquisition. An alternative is a strip-shaped realization, e.g. 1 m*1 cm.

In example embodiments, it is possible for an evaluative electronics system of the capacitive environment sensor system to be integrated into the housing of the contact sensor system, for example of an acceleration and/or pressure sensor system. The advantage here is lower costs due to the common use of the components already present for the acceleration or pressure sensor system, e.g. housing communication lines and modules for communication between the sensor system and the control device. Voltage supply lines and modules may also then be used in common. In a further integration stage, an integration of the evaluation circuit of the capacitive sensor system into the evaluation ASIC of the acceleration or pressure sensor is also conceivable. This would result in a further reduction in costs. Here, three levels of integration are possible:

1. Integration into the sensor housing. Here, an additional evaluation IC for the capacitive environment sensor system would be attached alongside the evaluation ICs already used today for the external acceleration sensing, on the same circuit board. Here, costs can be saved for housing bushing cablings, compared to the use of two separate housings for the sensors.

2. Besides the micromechanical sensor element and the appertaining evaluation ASIC for the acceleration measurement, another evaluation ASIC is attached in the housing for the evaluation of the capacitive proximity sensor system.

3. An integration of the evaluation circuit for the signal evaluation of the capacitive proximity sensor into the evaluation circuit of the known capacitive acceleration sensor. This highest form of integration has the greatest potential for synergy, because parts of the ASIC circuit of the acceleration sensor can also be used. Solutions 1 and 2 differ in that in solution 1 a separate sensor chip unit is attached in a common housing, so that a modular solution is present. Solution 2 provides the housing with a plurality of evaluation ASICs.

In the present case, a control device is an electrical device that evaluates the sensor signals that are present and produces a trigger signal as a function of these sensor signals. Here, triggering means that the person protecting means, such as airbags, seatbelts, but also active person protecting means such as brakes or an electronic stability system are activated. In the case of person protecting device having a pyrotechnic realization, such as airbags or seatbelts, current is supplied to an ignition element and this element is induced to explode. In electromotorically realized person protecting device, such as, again, seatbelts, a corresponding electric motor is operated.

The interfaces can be realized in terms of hardware and/or in terms of software. In this manner, it is possible for the interfaces to be fashioned for example on a microcontroller in the control device, and thus also to act as interfaces for sensor systems inside the control device itself. Given a realization in terms of hardware, combinations of integrated and discrete circuits are possible as needed.

The first signal can contain a single signal, but may also contain a plurality of signals. Standardly, this signal is formed digitally, because it can also relate to a quantity. In the planarly measuring capacitive environment sensor system, it can be a capacitance value, but can also be a value already derived from the capacitance.

The second signal can also contain a plurality of individual signals. Here as well, the signal can be related to a different value, and a pre-processing can also take place already in the contact sensor system.

As described herein, the contact sensor system can be realized for example as an acceleration sensor system and/or as an air pressure sensor system.

The at least one evaluation circuit can be a processor, for example a microcontroller or a dual core processor, but may also be an ASIC or a circuit constructed from discrete components. In particular, the evaluation circuit can have a plurality of regions that carry out processing tasks separately from one another. This increases the reliability of the processing of sensor signals. Therefore, the evaluation modules can be fashioned in terms of hardware and/or in terms of software. This also holds for the gating module. The modules communicate as software modules according to the prior art. The third trigger signal is transmitted from the evaluation circuit to the trigger circuit; here the trigger circuit, which can likewise be realized as an integrated circuit or can be made up of combinations of integrated and discrete components, has power switches that are actuated as a function of this third trigger signal. Here, at least two electrically controllable power switches are used, but it is however possible to use more than two such power switches.

Standardly, the interfaces, the evaluation circuit, and the trigger circuit are all present in the housing of the control device. The housing is standardly made of metal and/or plastic. However, it is also possible to provide a housing made of a foil.

Through the measures described herein, advantageous improvements are possible of the control device and method for triggering person protecting device.

It is advantageous that the second signal has at least one acceleration signal, so that an acceleration sensor system is then provided as the contact sensor system, situated in particular in the B-pillars or in other side areas of the vehicle. Acceleration signals supply reliable signals relating to a collision.

In addition, it is advantageous to use at least one air pressure signal as the second signal. This means that an air pressure sensor system is used in a side part of the vehicle. Here, the fact is exploited that, given a collision against this side part, a compression of the pressure in this side part occurs that is capable of being acquired quickly.

In addition, it is advantageous that the evaluation modules each have at least one threshold value decision unit. In this manner, a threshold value decision can be used to decide whether the first or second trigger signal is produced or not. Alternatively, it is possible for classifications or pattern recognitions to be carried out. Classifications are suitable in particular if the second signal has more than one individual signal, so that a vector is then present that can be assigned for example to a particular class, it then being decided as a function of this classification whether the trigger signal is produced or not.

Advantageously, the gating module has a logical AND gating. Alternatively, however, it is likewise possible for the gating to be realized for example as a classification. A pattern recognition or other gating methods yielding suitable results are also possible in the present case.

The derived signals for the threshold value comparison, or the classification, or the pattern recognition, can be integrated, multiply integrated, derived, filtered, averaged, or otherwise processed signals.

Exemplary embodiments of the present invention are shown in the drawing and are explained in more detail in the following description.

BRIEF DESCRIPTION OF THE DRAWINGS

FIG. 3 shows a first signal flow diagram for the explanation of the method according to an example embodiment of the present invention, FIG. 4 shows a second signal flow diagram, and FIG. 5 shows a third signal flow diagram.

DETAILED DESCRIPTION

Figure 1:
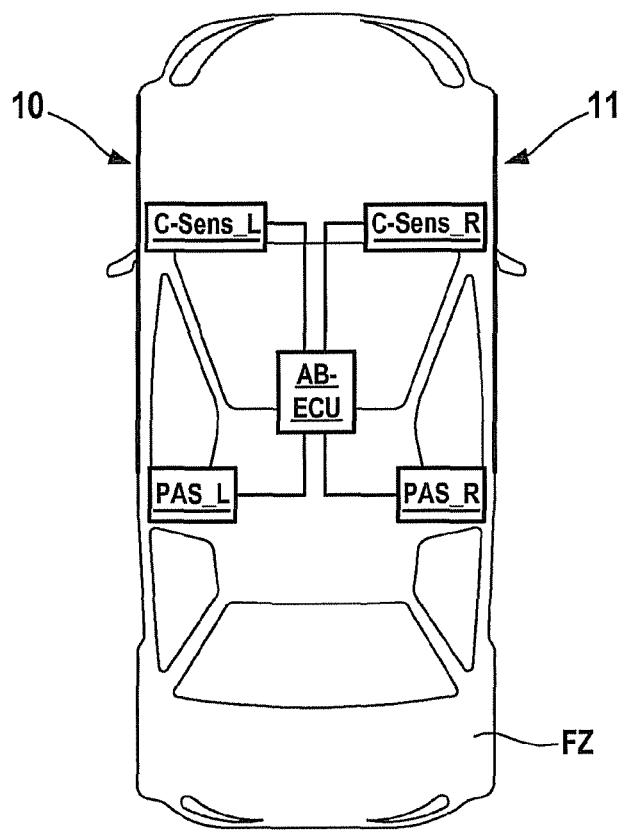
FIG. 1 shows a block diagram of a sensor configuration having a control device in the vehicle.

FIG. 1 explains, in a block diagram, how the contact sensor system and the capacitively planarly measuring environment sensor system can be situated in the vehicle and connected to the control device. In vehicle FZ, a sensor electrode 11 is situated at right in the vehicle, and a sensor electrode 10 is present at left, opposite thereto. These sensor electrodes are used, in the manner known from the prior art, to detect an object situated in the environment of vehicle FZ via a change in capacitance, in that this object forms a series circuit of capacitances with the ground and with the sensor electrode. These sensor signals are then sent to air bag control device AB-ECU by sensors C-Sens_L and C-Sens_R. However, control device AB-ECU also receives acceleration signals, in particular in the direction transverse to the vehicle, from external acceleration sensors PAS_L and PAS_R, which are situated for example in the area of the B-pillar.

In addition, it is also possible for air pressure sensors situated in the side parts of the vehicle to transmit signals to air bag control device AB-ECU.

Acceleration sensors PAS_L and PAS_R have micromechanically manufactured acceleration sensor modules that, under the influence of deceleration, modify an electrically acquirable parameter that is then transmitted, also in a modified form, to the air bag control device as a measurement value. For the transmission, for example a modulation of a quiescent current can be used. A bus connection is also possible in the present case. It is possible for the function of an air bag control device AB-ECU to be distributed to further control devices, or for air bag control device AB-ECU to be integrated into a safety control device that can also trigger active person protection devices such as brakes or an electronic stability program.

The installation locations of the sensors can be varied according to the ability of the person skilled in the art and the needs of the particular situation. In the present case, as in the other representations as well, only the components that are required for an example embodiment of the present invention are shown. Other components required for operation have been omitted for the sake of simplicity.

Figure 2:
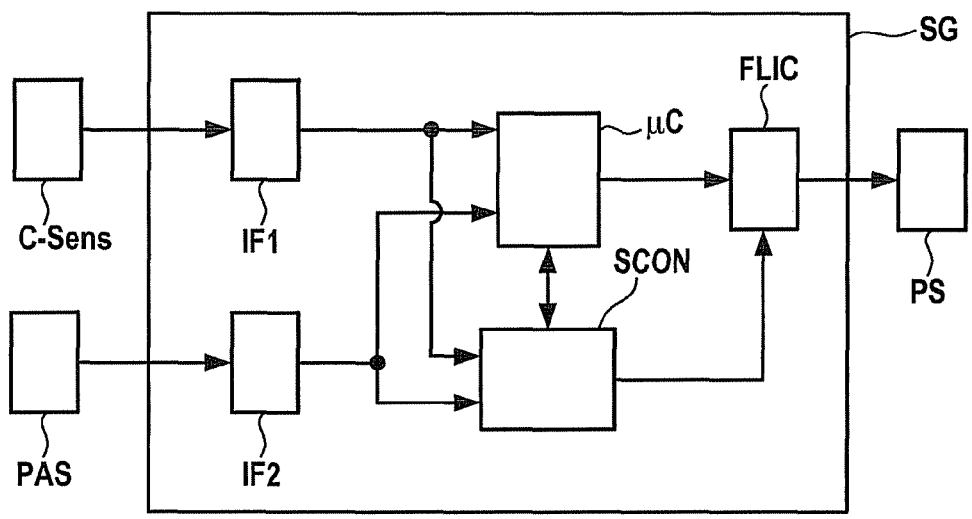
FIG. 2 shows a block diagram of the control device according to an example embodiment of the present invention with connected components.

FIG. 2 shows a block diagram of control device SG according to an example embodiment of the present invention with connected components. Planar capacitive environment sensor system C-Sens supplies a signal to a first interface IF1 that is fashioned here as an integrated circuit. Peripheral acceleration sensor system PAS supplies its signals to a second interface IF2 that is also fashioned as an integrated circuit. It is possible for the first and the second interface to be united to form a single integrated circuit. The signals are converted by interfaces IF1 and IF2 into a format that is readable for microcontroller μC and for safety module SCON, for example into the so-called SPI (Serial Peripheral Interface Bus) format. Both microcontroller μC and safety module SCON evaluate the sensor signals of the capacitive environment sensor system and of the acceleration sensor system separately. For this purpose, as described above, for example threshold value comparisons, also with adaptive threshold values, classification designs, and/or pattern recognition are used. Safety module SCON also monitors microcontroller μC, using a watchdog unit.

If both evaluation circuits, microcontroller μC and safety module SCON, reach the result that both sensor signals make it necessary to trigger the personal protection device, corresponding signals are sent to trigger circuit FLIC. Trigger circuit FLIC has an evaluation unit for the signals of microcontroller μC and of safety semiconductor SCON, as well as their gating, and also has the electrically controllable power switches that are actuated as a function of the trigger signals. If the triggering case is recognized by microcontroller μC and safety module SCON, personal protection device PS will be triggered.

Microcontroller μC and safety module SCON have separate evaluation modules for the individual sensor signals. For this purpose, separate software modules, a first and a second evaluation module, are provided on microcontroller μC. Safety semiconductor SCON has separate circuits for this purpose. The signals of the evaluation modules are then gated by a gating module in order to produce the actual trigger signal for trigger circuit FLIC. In safety semiconductor SCON, this is a third circuit.

Thus, on microcontroller μC the first and the second evaluation module for evaluating the signals of the capacitively measuring environment sensor system and of contact sensor system PAS are present as software modules. The gating module connects the results of these two evaluation modules. Additional software modules can be present on microcontroller μC.

FIG. 3 shows, in a first signal flow diagram, the method according to an example embodiment of the present invention. The signal of capacitively measuring environment sensor system C_Sens goes into a smoothing module 300. This smoothing module 300 carries out this smoothing for example through a low-pass filtering, an integration, a mean value formation, or through other known methods for smoothing the signal. The smoothed signal then goes into a threshold value decision unit 301. Here, a pre-processing, for example an integration, etc., may also be provided. The threshold value of threshold value decision unit 301 can in particular be realized adaptively; i.e., it can be modified as a function of the temporal behavior of the sensor signal and/or of additional sensor signals. If there is an at least long-lasting exceeding of the threshold value, threshold value decision unit 301 emits a signal characterizing this exceeding of the threshold value to AND gate 302. In the present case, AND gate 302 forms the comparator module. The signal of the contact sensor system, in the present case an acceleration signal, is also smoothed in block 303. Here as well, the above-named methods can be used; in the present case, integration is used. The integrated acceleration signal is supplied in block 304 to a threshold value decision unit that likewise has an adaptively formed threshold value. The output signal of this threshold value decision unit 304 also goes into AND gate 302. AND gate 302 gates the two output signals, and only if both of them indicate a triggering is third triggering signal 305 produced.

FIG. 4 shows another exemplary embodiment of the method according to the present invention. Again, the signal of the capacitively measuring sensor system is smoothed in block 400, as described above. The smoothed signal is then classified in block 401. The result of the classification is supplied in block 402. The acceleration signal is also again in smoothed in block 403 as described above. The acceleration signal is also classified in block 404. This second classification result is supplied to block 402, which from the two classifications carries out a further classification that determines third trigger signal 405. A combination of the exemplary embodiments according to FIG. 3 and FIG. 4 is possible. A combination according to FIG. 5, as described below, is also possible.

FIG. 5 shows a third exemplary embodiment of the method according to the present invention. Here, the signal of the capacitively measuring environmental sensor system is again in smoothed in block 500 and is then classified in block 501. However, the smoothed signal is also supplied to classification 504, into which the smoothed acceleration signal goes, from smoothing module 503. The smoothed acceleration signal is however also supplied to classification 501. In this manner, a mutual influencing of the two evaluation paths is present. It is also possible to provide this only on one side and to combine this with other exemplary embodiments according to FIG. 3 and FIG. 4.

Block 502 again carries out a fusion of the classifications, so that third trigger signal 505 is formed.

What is claimed is:

1. A control device for triggering a person protection device, comprising:
a first interface adapted to provide a first signal of a planarly measuring capacitive environment sensor system;
a second interface adapted to provide a second signal of a contact sensor system;
a first evaluation circuit adapted to produce, as a function of the first signal and the second signal, a first trigger signal;
a second evaluation circuit adapted to produce, as a function of the first signal and the second signal, a second trigger signal; and
a trigger circuit having a gating module adapted to produce, as a function of the first and second trigger signals, a third trigger signal, wherein the trigger circuit is adapted to trigger, as a function of the third trigger signal, the person protection device.

2. The control device according to claim 1, wherein the second signal has at least one acceleration signal.

3. The control device according to claim 1, wherein the second signal has at least one air pressure signal.

4. The control device according to claim 1, wherein the first and second evaluation circuits each have a threshold value decision unit.

5. The control device according to claim 1, wherein the gating module has a logical AND gating.

6. A method for triggering a person protection device, comprising:
providing a first signal of a planarly measuring capacitive environment sensor system;
providing a second signal of a contact sensor system;
producing, by a first evaluation circuit, a first trigger signal as a function of the first signal and the second signal;
producing, by a second evaluation circuit, a second trigger signal as a function of the first signal and the second signal;
producing, by a gating module, a third trigger signal as a function of a gating of the first and second trigger signals; and
triggering, by a trigger circuit, the person protection device as a function of the third trigger signal.

7. The method according to claim 6, wherein the production of the first trigger signal includes at least one first threshold value comparison of the first signal.

8. The method according to claim 6, wherein the production of the second trigger signal is includes at least one second threshold value comparison of the second signal.

9. The method according to claim 6, wherein a logical AND gating is used as the gating.

10. The method according to claim 6, wherein the first trigger signal is produced by supplying the first signal and the second signal, to at least one classification module of the first evaluation circuit.

* * * * *

UNITED STATES PATENT AND TRADEMARK OFFICE
CERTIFICATE OF CORRECTION

PATENT NO.       : 8,648,613 B2
APPLICATION NO.  : 12/672642
DATED            : February 11, 2014
INVENTOR(S)      : Ewerhart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this
Twenty-ninth Day of September, 2015

Michelle K. Lee
*Director of the United States Patent and Trademark Office*